US009231826B2

(12) United States Patent  
Liu

(10) Patent No.: US 9,231,826 B2  
(45) Date of Patent: Jan. 5, 2016

(54) ZERO CONFIGURATION OF A VIRTUAL DISTRIBUTED DEVICE

(75) Inventor: Lifang Liu, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 219 days.

(21) Appl. No.: 13/589,812

(22) Filed: Aug. 20, 2012

(65) Prior Publication Data

US 2013/0046865 A1  Feb. 21, 2013

(30) Foreign Application Priority Data

Aug. 18, 2011 (CN) .......................... 2011 1 0241991

(51) Int. Cl.
 G06F 15/177 (2006.01)
 H04L 12/24 (2006.01)

(52) U.S. Cl.
 CPC ........ H04L 41/0886 (2013.01); H04L 41/0803 (2013.01); H04L 41/12 (2013.01)

(58) Field of Classification Search
 CPC .......................... H04L 41/12; H04L 41/0803
 USPC .................... 709/220, 223, 227, 238
 See application file for complete search history.

(56) References Cited

U.S. PATENT DOCUMENTS

2007/0233825 A1* 10/2007 Brownell et al. ............. 709/220  
2009/0132698 A1* 5/2009 Barnhill, Jr. ................. 709/224  
2010/0146323 A1* 6/2010 Hu ................................. 714/2

FOREIGN PATENT DOCUMENTS

| CN | 101064714 | 10/2007 |
|---|---|---|
| CN | 101355554 | 1/2009 |
| CN | 101572626 | 11/2009 |
| CN | 101827003 | 9/2010 |

OTHER PUBLICATIONS

CN Office Action dated Nov. 11, 2013 issued on CN Patent Application No. 201110241991.9 dated Aug. 18, 2011, The State Intellectual Property Office, P.R. China.
English translation of sections 1.1.1 and 1.1.2 of "H3C S5500-EI", Hangzhou H3C Technologies Co., Ltd., Jul. 8, 2010.
CN Office Action dated Aug. 31, 2012 issued on CN Patent Application No. 201110241991.9 filed on Aug. 18, 2011, The State Intellectual Property Office, the P.R. China.
CN Office Action dated Jan. 7, 2013 issued on CN Patent Application No. 201110241991.9 filed on Aug. 18, 2011, The State Intellectual Property Office, the P.R. China.

(Continued)

Primary Examiner — Joseph E Avellino  
Assistant Examiner — Marshall McLeod  
(74) Attorney, Agent, or Firm — Mannava & Kang, P.C.

(57) ABSTRACT

A method of zero configuration for a virtual distributed device in a distributed network is disclosed. A plurality of peer devices are added as virtual devices to a network device. Configuration information is imported to the network device. A peer group comprising the plurality of peer devices, and corresponding topology of the peer group, are established in the network device. A connection between the network device and one of the plurality of peer devices is established via an uplink switch, the plurality of peer devices being connected to one another by virtual links. The network device distributes the configuration information to the plurality of peer devices in accordance with the established topology via the peer device connected to the uplink switch.

20 Claims, 4 Drawing Sheets

(56) References Cited

OTHER PUBLICATIONS

"Reducing network complexity, boosting performance with HP IRF technology"; White paper, Created Sep. 2010.

"Virtual Connect and HP A-Series switches IRF Integration Guide"; Technical white paper, Created May 2011.

Search Report dated Apr. 30, 2013 issued on DE Utility Model No. 202010103103.5 granted on Sep. 24, 2012, German Patent and Trade Mark Office.

* cited by examiner

ZERO CONFIGURATION OF A VIRTUAL DISTRIBUTED DEVICE

The present application claims priority under 35 U.S.C. 119 (a)-(d) to Chinese Patent application number 201110241991.9, filed on Aug. 18, 2011, which is incorporated by reference herein in its entirety.

BACKGROUND

The present disclosure relates to communication technology. In particular, the present disclosure relates to a method and a network device for realising zero configuration of a virtual distributed device.

CWMP (Customer Premises Equipment (CPE) WAN Management Protocol) is a technical specification initiated and developed by the DSL (Digital Subscriber's Line) forum, with a serial number of TR069, therefore also referred to as the TR069 protocol. It provides a general purpose framework, information specification, management method and data module for implementing the management and configuration of home network devices in the next generation network.

CWMP is mainly used in the DSL access network environment. In a DSL access network, due to the large number of client devices, their deployment being distributed, and often deployed on the user side, management and maintenance of these devices are often challenging. CWMP proposes remote centralised control of CPEs through an ACS (Auto-Configuration Server), in order to overcome management difficulties of CPEs, save maintenance cost and improve problem-solving efficiency.

Zero configuration is often used when deploying large-scale devices or when the distribution of the devices to be deployed is dispersed, which allows the automatic deployment of the corresponding configuration information by a network administrator upon power-on of the devices. Therefore deployment efficiency can be improve, and deployment costs and the probability of error in manual configuration can be reduced.

However, applying zero configuration deployment in software virtualisation technology to a virtual distributed device is different from the zero configuration deployment of a common single device. It involves the complexity of virtual uplink networking as well as methods for detecting deployment results, which create many problems for the zero configuration deployment of virtual distributed devices.

One such software virtualisation technology is VSS (Virtual Switching Systems). Another example is IRF (Intelligent Resilient Framework). The core concept of IRF is to connect multiple peer network devices via IRF physical ports, perform the necessary configurations, and virtualise the multiple peer devices into a single "distributed device". Through the use of such virtualisation technology, it is possible to integrate hardware resources and software processing capability of multiple devices, thus realising collaborative operation, unified management and uninterrupted maintenance of multiple peer devices.

DESCRIPTION OF THE DRAWINGS

For a more complete understanding of the present disclosure, specific examples will now be explained with reference to the accompanying drawings, in which.

DESCRIPTION OF THE EMBODIMENTS

An example will first be described, which is useful for the understanding of the embodiments. The example shows a zero configuration method for a single device.

A zero configuration method for a single device may be based on DHCP (Dynamic Host Configuration Protocol) Option 43 and TR069 protocols, and the device cooperates with an ACS server to complete zero configuration.

First, a network administrator deploys an ACS server, and formulates a zero configuration strategy. Then, a DHCP server is configured with the IP address, username and password information of the ACS. The CPE that is the subject of zero configuration is powered-on, accesses the network, and sends a DHCP request. The DHCP server sends the IP address and certification information of the ACS to the CPE in response. Then the ACS sends the initial configuration and software to the CPE.

This method may be applied to configure a virtual distributed device such as an IRF device as follows.

Each device uplinks via a separate independent uplink, powers-on, and completes the single-device zero configuration. The administrator confirms at the ACS server that the execution of zero configuration is successful. The individual uplink connections are broken, and IRF links amongst the individual devices are established. The administrator confirms the connection status of IRF links establishment. The link aggregation of the uplink device is configured, and the connections of various physical links of the IRF devices are completed.

An embodiment of the present disclosure will now be described with reference to the drawings.

Figure 1:
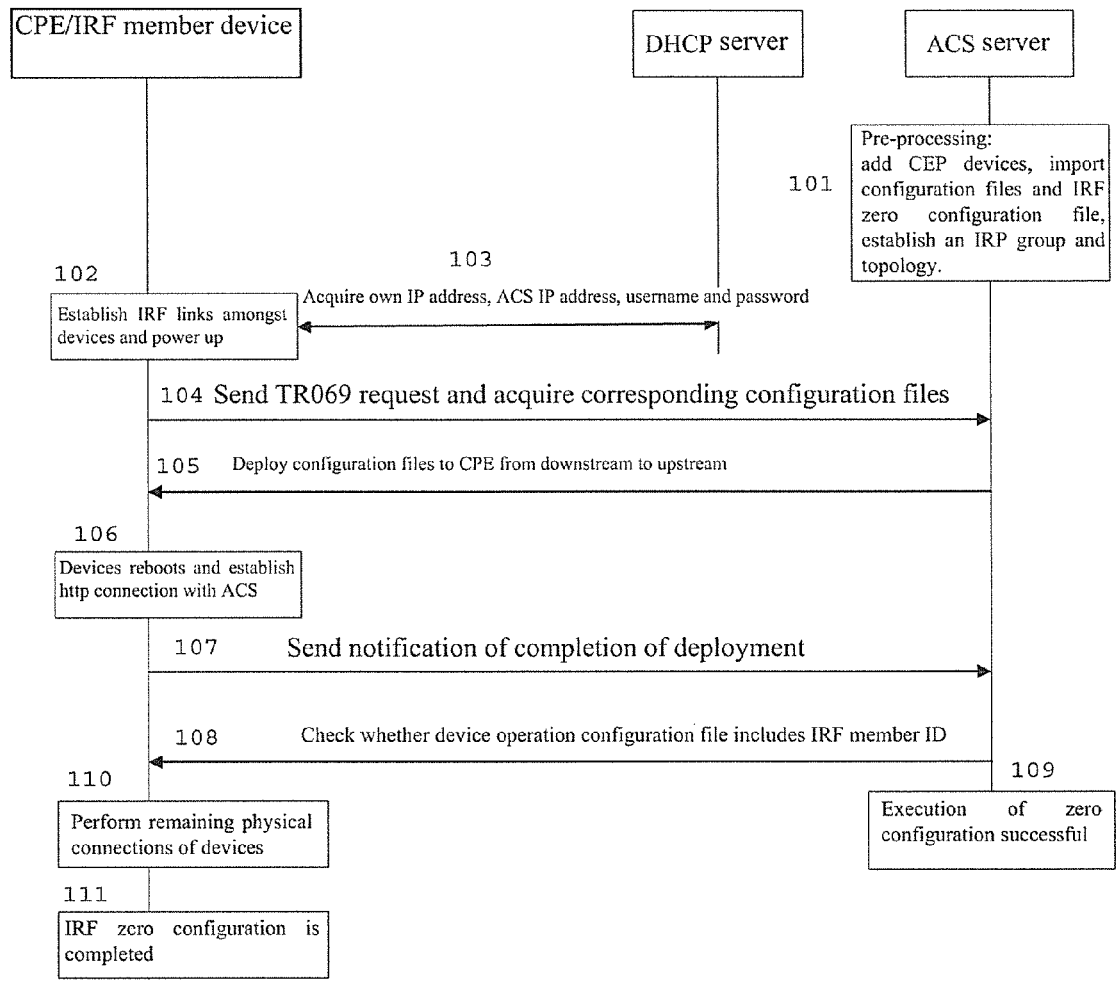
FIG. 1 is a flowchart of an embodiment of a zero configuration for a virtual distributed device in a distributed network.

FIG. 1 is a flowchart of a method of zero configuration for a virtual distributed device in a distributed network according to the present embodiment. A virtual distributed device may include one or more peer devices virtualised to function as a single virtual device by implementation of a suitable virtualisation technology. A peer device may be a CPE, such as a telephone, router, switch, set-top box, networking adaptor or internet access gateway, etc., or any other suitable device or equipment. A suitable virtualisation technology may include but not limited to intelligent resilient framework (IRF) and virtual switching systems (VSS). In the following embodiments, a CPE functions as an IRF member device and is considered a peer device, and the virtualisation technology used, as an example only, is IRF.

It may be desirable to carry out network planning before zero configuration, so as to facilitate the generation of configuration files. This procedure is not shown in FIG. 1. For example, network planning for a distributed network (see for example FIG. 2), comprising a DHCP server, an ACS, a DHCP relay, an uplink switch a and a plurality of IRF member devices Unit 2, Unit 3 and Unit 5, may include the following aspects.

(1) Determine the uplink connection mode of the plurality of IRF member devices to determine whether link aggregation is required, and if so, perform the configuration of link aggregation on the uplink switch.

(2) Confirm a member ID for each of the plurality of IRF member devices.

(3) Confirm the physical connection ports of the plurality of IRF member devices.

Turning now to the method of FIG. 1. At block 101, pre-processing is performed at the ACS server, which includes:

(1) Adding the plurality of CPEs as IRF member devices into the ACS server, or in other words, adding the plurality of CPEs into the ACS server as virtual devices. This may be performed, for example, by adding the serial numbers of the plurality of CPEs into the ACS. Note that the CPEs do not establish TR069 connections with the ACS.

(2) Importing configuration information that is to be deployed into the ACS server. The configuration information may include a basic configuration file, IRF configuration files for the plurality of IRF member devices, a link aggregation configuration file and other service configuration files.

(3) Establishing in the ACS an IRF group and a corresponding IRF topology, for instance, the physical connection relationship amongst the IRE member devices. The established IRF group includes the plurality of IRF member devices.

It is preferable to establish an IRF group. Prior to establishing IRF links, the plurality of CPEs are separate and independent entities. Upon establishing IRF links, the plurality of CPEs forms an IRF group that is regarded as a single entity by the ACS server for the purpose of realising the management of various services of the IRF member devices.

It is preferable to establish an IRF topology. Upon completion of zero configuration, the uplink ports of the plurality of IRF member devices are in IRF mode, making them unable to forward user data packets. In this scenario, if the zero configuration of an upstream device completes before a downstream device, the network connection of the downstream device may be blocked and so the zero configuration of the downstream device may not be able to continue to completion. When an IRF topology is established, the ACS server may perform zero configuration deployment on the plurality of IRF member devices in accordance with the corresponding topology, in the direction from downstream to upstream, to ensure the completion of the zero configuration of all of the plurality of IRF member devices.

(4) Establishing a zero configuration task for the IRF group, and designating a member ID for each of the plurality of IRF member devices.

At block 102, the plurality of IRF member devices are connected by IRF links, and one of the plurality of IRF member devices is connected to the uplink switch, then the plurality of IRF member devices are powered-on.

Figure 2:
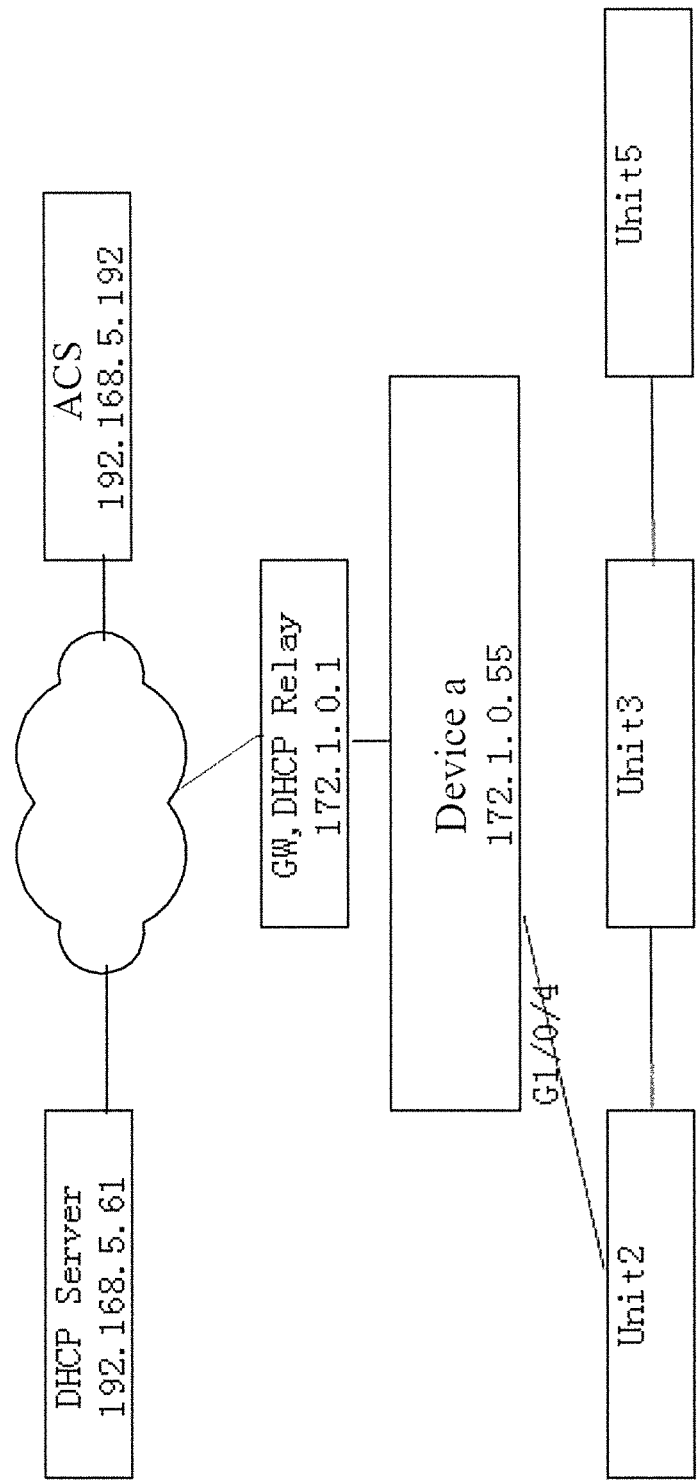
FIG. 2 shows a network configuration before applying the zero configuration method of FIG. 1.

This is the pre-processing for the IRF member device network group prior to zero configuration, the remaining links are connected at the end of the zero configuration. FIG. 2 is the network configuration prior to zero configuration according to the present embodiment.

In the present embodiment, a linear network topology is adopted which prevents the formation of loops. According to the present embodiment, the administrator is required to perform two connections only, thus reducing the interference of the administrator.

At block 103, the plurality of IRF member devices acquire, automatically, their own IP addresses from the DHCP server via the IRF member device that is connected to the uplink switch, and furthermore acquire the parameters of the ACS server such as the IP address, username and password.

According to the group network configuration of this embodiment, since only one IRF member device is connected to the uplink switch, while uplink connections with the DHCP server, the ACS server and other uplink devices from the other IRF member devices are performed via the IRF member device that is connected to the uplink switch. In the present embodiment, the uplink forwarding by the IRF member device connected to the uplink switch is referred to as "transit".

At block 104, the plurality of IRF member devices send TR069 requests to the ACS server for acquiring the relevant configuration information via the IRF member device connected to the uplink switch.

At block 105, the ACS deploys (distributes) the configuration files to the plurality of IRF member devices in accordance with the established IRF topology, here, in the direction from downstream to upstream.

At block 106, upon receiving the configuration files, the plurality of IRF member devices automatically reboot.

At block 107, the plurality of IRF member devices notifies the ACS server that the deployment of the configuration files is successful.

At block 108, when the ACS server receives the notification that the configuration files have been successfully deployed, it determines whether the current operation configuration files contain the IRF member IDs of the plurality of IRF member devices. If so, the ACS server determines that the IRF establishment of the plurality of IRF member devices has been successfully completed, and that the zero configuration has been successfully executed.

As shown at block 109, upon completion of the zero configuration, the ACS server alerts the administrator to perform the remaining physical connections amongst the plurality of CPEs. If the zero configuration is determined as unsuccessful, the ACS server informs the administrator of the failure reason.

The plurality of IRF member devices reboot after acquiring the configuration files, and they are temporarily unable to access the ACS server after the rebooting, thus the ACS server is unable to acquire the notifications of configuration files deployment result from the IRF member devices. The IRF member devices will continuously attempt to establish http connections with the ACS server until http connections are established, and send the notifications to the ACS server. In this way, the ACS server is able to receive the configuration files deployment results from the plurality of IRF member devices, and the notifications are used to determine the successful execution of zero configuration.

Figure 3:
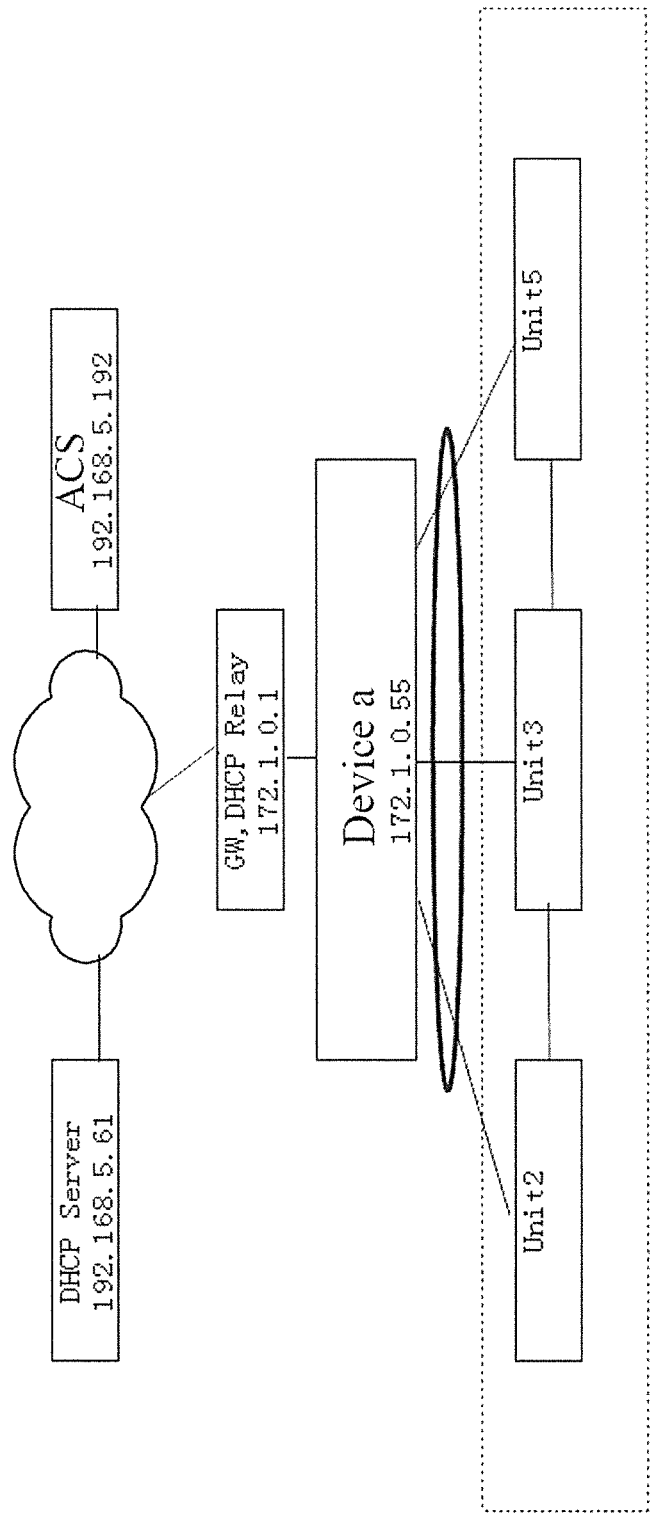
FIG. 3 shows a network configuration after applying the zero configuration method of FIG. 1.

At block 110, the administrator completes all physical connections, and zero configuration is completed. The network configuration after the completion of zero configuration is shown in FIG. 3.

At block 111, after IRF connections are established amongst the plurality of CPEs, the plurality of CPEs functioning as a plurality of IRF member devices for a single virtual IRF equipment, that corresponds with the outside as a single entity, and cooperates with the ACS server to perform various management tasks to complete the IRF zero configuration.

As shown in FIG. 1, the method of zero configuration for a virtual distributed device according to the present embodiment only requires an administrator to perform an operation at blocks 101, 102 and 110, while the remaining blocks are executed automatically. Therefore, the method of the present embodiment requires less manual interference compared to conventional methods. The method of the present embodiment allows the zero configuration of a virtual distributed device comprising a plurality of peer devices to be performed with minimal manual interference and minimal interference to the existing network.

Figure 4:
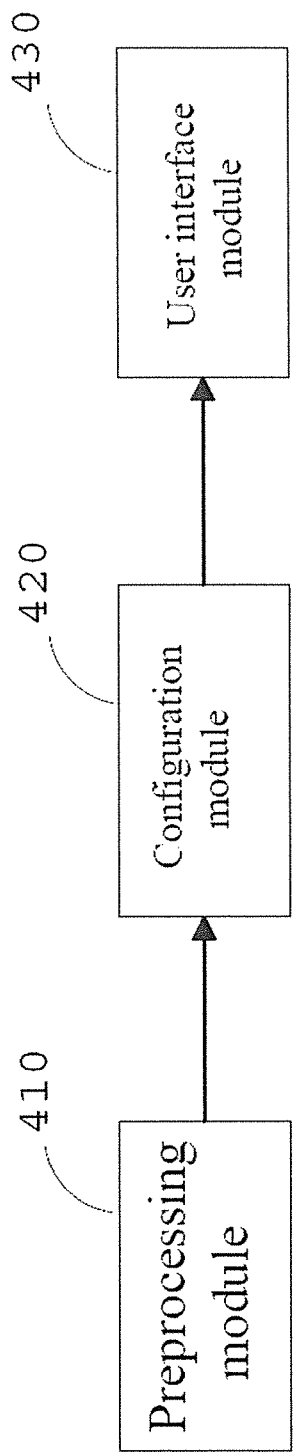
FIG. 4 is a schematic diagram of an embodiment of a network device used in the distributed network of FIG. 2 and FIG. 3.

FIG. 4 is a schematic diagram of an embodiment of a network device capable of performing the function of the ACS server as described above. As shown in FIG. 4, the network device comprises a pre-processing module 410, a configuration module 420 and a user interface module 430.

In use, the pre-processing module 410 adds one or more peer devices, such as the plurality of IRF member devices described above, into the network device as one or more virtual device, imports configuration information to the network device to be deployed to the one or more peer devices, establishes in the network device a peer group, such as the IRF group that includes the plurality of peer devices, and establishes in the network device a corresponding topology of the peer group, for example an IRF topology corresponding to the IRF group. The plurality of peer devices are connected to one another via virtual links, and one of the peer devices is connected to an uplink switch.

In use, the configuration module 420 deploys and distributes the configuration information imported by the pre-processing module 410 to the plurality of peer devices in accordance with the corresponding topology via the peer device connected to the uplink switch. The deployment may be performed in the direction from downstream to upstream.

In use, the user interface module 430 alerts an administrator to establish physical links amongst the plurality of peer devices after the configuration module 420 has successfully deployed the configuration files to the plurality of peer devices.

In an embodiment, the pre-processing module 410 may be configured to add a plurality of peer devices to the network device by adding a serial number of each of the plurality of peer devices to the network device.

In an embodiment, the configuration module 420 may be configured to execute the operation of deploying the configuration files upon receiving a TR069 request from a peer device.

In an embodiment, the configuration module 420 may be configured to receive from the plurality of peer devices notifications that the configuration files have been successfully deployed, and on the basis of the received notification determine whether the zero configuration has been completed successfully. If the zero configuration has been completed successfully, the configuration module 420 notifies the user interface module 430 of the completion of the zero configuration.

Although the flow diagrams described above show a specific order of execution, the order of execution may differ from that which is depicted. For example, the order of execution of two or more blocks may be interchanged relative to the order shown. Also, two or more blocks shown in succession may be executed concurrently or with partial concurrence. All such variations are within the scope of the present disclosure.

The above examples can be implemented by hardware, software, firmware, or a combination thereof. For example, the various methods, processes and functional modules described herein may be implemented by a processor (the term processor is to be interpreted broadly to include a CPU, processing unit, ASIC, logic unit, or programmable gate array etc.). The processes, methods and functional modules may all be performed by a single processor or divided amongst several processors. The processes, methods and functional modules may be implemented as machine readable instructions executable by one or more processors, hardware logic circuitry of the one or more processors, or a combination thereof. Further, the teachings herein may be implemented in the form of a software product, the computer software product being stored in a storage medium and comprising a plurality of instructions for making a computer device (e.g. a personal computer, a server or a network device such as a router, switch, access point etc.) implement the method recited in the examples of the present disclosure.

It should be understood that embodiments of the method of zero configuration for a virtual distributed device in a communication network, and embodiments of the network device given above are implementation examples only, and do not limit the scope of the invention. Numerous other changes, substitutions, variations, alternations and modifications may be ascertained by those skilled in the art, and it is intended that the present disclosure encompass all such changes, substitutions, variations, alterations and modifications as falling within the spirit and scope of the appended claims.

The invention claimed is:

1. A method of zero configuration for a virtual distributed device in a distributed network, comprising:
adding, by a processor of a network device, a plurality of peer devices as virtual devices to the network device, wherein the network device is connected to the peer devices through a wide area network (WAN);
importing, by the processor, configuration information into the network device;
establishing in the network device, by the processor, a peer group comprising the plurality of peer devices and corresponding topology of the peer group;
creating, by the processor, a virtual distributed device comprised of the plurality of peer devices added as the virtual devices to the network device, wherein the virtual distributed device functions as a single virtual device by implementation of a virtualization technology, and the virtual distributed device is regarded as a single entity by the network device for the purpose of realizing management of services of the plurality of peer devices;
establishing, by the processor, a connection between the network device and one peer device of the plurality of peer devices via an uplink switch, the plurality of peer devices being connected to one another by virtual links; and
distributing, by the processor, the configuration information to the plurality of peer devices in accordance with the corresponding topology via the peer device connected to the uplink switch, wherein the configuration information is distributed to the plurality of peer devices in a direction from downstream to upstream in accordance with the corresponding topology.

2. The method of claim 1 wherein the peer group is established using Intelligent Resilient Framework (IRF) to form an IRF virtual distributed device.

3. The method of claim 1 further comprising alerting a user to establish physical links to the plurality of peer devices after distributing the configuration information.

4. The method of claim 1 wherein adding the plurality of peer devices as virtual devices to the network device includes obtaining, by the processor, a serial number of each of the plurality of peer devices.

5. The method of claim 1 further comprising causing the plurality of peer devices to acquire respective IP addresses via the peer device connected to the uplink switch, to acquire the IP address, username and password of the network device, and to send a request to the network device for acquiring the configuration information.

6. The method of claim 1 further comprising:
causing each of the plurality of peer devices to reboot upon receiving the configuration information from the network device, to establish a connection with the network device after rebooting, and to send a notification to the network device when the connection is established; and the network device determining that the zero configuration is complete according to the notification from the plurality of peer devices.

7. The method of claim 2 wherein the configuration information includes IRF configuration information and link aggregation configuration information.

8. A network device for a distributed network, comprising:
a processor; and
a non-transitory computer readable storage medium storing instructions that when executed by the processor cause the processor to:
add a plurality of peer devices as virtual devices to the network device,
import configuration information to the network device,
establish in the network device a peer group comprising the plurality of peer devices and corresponding topology of the peer group,
create a virtual distributed device comprised of the plurality of peer devices added as the virtual devices to the network device, wherein the virtual distributed device functions as a single virtual device by implementation of a virtualization technology, and the virtual distributed device is regarded as a single entity by the network device for the purpose of realizing management of services of the plurality of peer devices,
establish a connection between the network device and one peer device of the plurality of peer devices via an uplink switch, the plurality of peer devices being connected to one another by virtual links, and
distribute the configuration information to the plurality of peer devices in accordance with the corresponding topology via the peer device connected to the uplink switch, wherein the configuration information is distributed to the plurality of peer devices in a direction from downstream to upstream in accordance with the corresponding topology.

9. The network device of claim 8, wherein, to establish the peer group, the instructions are to cause the processor to use Intelligent Resilient Framework (IRF) to form an IRF virtual distributed device.

10. The network device of claim 8, wherein the instructions are to cause the processor to alert a user to establish physical links to the plurality of peer devices after the configuration information is distributed.

11. The network device of claim 8, wherein to add the plurality of peer devices as virtual devices to the network device, the instructions are to cause the processor to obtain a serial number of each of the plurality of peer devices.

12. The network device of claim 8, wherein the processor is to receive a notification from the plurality of peer devices after the configuration information is distributed, and determine that configuration is complete according to the notification.

13. A method of configuring an Intelligent Resilient Framework (IRF) device, comprising:
adding, by a processor of an auto-configuration server (ACS), a plurality of IRF member devices as virtual devices to the ACS;
importing, by the processor, configuration information to the ACS;
establishing in the ACS, by the processor, an IRF group comprising the plurality of IRF member devices and corresponding IRF topology of the IRF group;
creating, by the processor, a virtual distributed device comprised of the plurality of peer devices added as the virtual devices to the network device, wherein the virtual distributed device functions as a single virtual device by implementation of a virtualization technology, and the virtual distributed device is regarded as a single entity by the ACS for the purpose of realizing management of services of the plurality of peer devices;
establishing, by the processor, a connection between the ACS and one IRF member device of the plurality of IRF member devices via an uplink switch, the plurality of IRF member devices being connected to one another by IRF links; and
distributing, by the processor, the configuration information to the plurality of IRF member devices in a direction from downstream to upstream in accordance with the corresponding IRF topology via the IRF member device connected to the uplink switch.

14. The method of claim 13, comprising alerting a user to establish physical links to the plurality of IRF member devices after distributing the configuration information.

15. The method of claim 13, comprising causing the plurality of IRF member devices to acquire respective IP addresses via the IRF member device connected to the uplink switch, to acquire an IP address, username and password of the ACS, and to send a request to the ACS for acquiring the configuration information.

16. The method of claim 13 further comprising:
causing each of the plurality of IRF member devices to reboot upon receiving the configuration information from the ACS, to establish a connection with the ACS after rebooting, and to send a notification to the ACS when the connection is established; and
the ACS determining that the zero configuration is complete according to the notification from the plurality of IRF member devices.

17. The method of claim 13 wherein the configuration information includes IRF configuration information and link aggregation configuration information.

18. The method of claim 13 wherein adding the plurality of IRF member devices as virtual devices to the ACS includes obtaining, by the processor, a serial number of each of the plurality of IRF member devices.

19. The method of claim 1, wherein distributing the configuration information comprises distributing the configuration information to the plurality of peer devices only via the established connection between the ACS and the peer device connected to the uplink switch.

20. The network device of claim 8, wherein the processor is to distribute the configuration information to the plurality of peer devices only via the established connection between the network device and the peer device connected to the uplink switch.

* * * * *